Aug. 3, 1926.

H. C. JONES

1,594,369

AUTOMATIC FOCUSING APPARATUS FOR PHOTOGRAPHIC LENSES

Filed Dec. 5, 1922     4 Sheets-Sheet 1

Aug. 3, 1926. 1,594,369
H. C. JONES
AUTOMATIC FOCUSING APPARATUS FOR PHOTOGRAPHIC LENSES
Filed Dec. 5, 1922 4 Sheets-Sheet 2

Inventor
Harry C. Jones,
By his Attorneys,
Ward, Crosby and Smith

Aug. 3, 1926.

H. C. JONES 1,594,369

AUTOMATIC FOCUSING APPARATUS FOR PHOTOGRAPHIC LENSES

Filed Dec. 5, 1922     4 Sheets-Sheet 3

Inventor
Harry C. Jones,
By his Attorneys,
Ward, Crosby and Smith

Aug. 3, 1926.

H. C. JONES 1,594,369

AUTOMATIC FOCUSING APPARATUS FOR PHOTOGRAPHIC LENSES

Filed Dec. 5, 1922      4 Sheets-Sheet 4

Inventor
Harry C. Jones
By his Attorneys
Ward, Crosby and Smith

Patented Aug. 3, 1926.

1,594,369

UNITED STATES PATENT OFFICE.

HARRY C. JONES, OF LARCHMONT, NEW YORK.

AUTOMATIC FOCUSING APPARATUS FOR PHOTOGRAPHIC LENSES.

Application filed December 5, 1922. Serial No. 604,979.

My invention relates to automatic focusing apparatus for photographic lenses and particularly to devices whereby focus will be maintained at all times during the adjustment of a reproducing machine for enlarging or reducing an object in desired ratios.

Objects of the invention comprise the production of an effective and comparatively simple device of the character mentioned whereby various improved effects are obtained; notable among these are the production of a compact apparatus in which enlargements and reductions of greater ratio may be obtained than have previously been possible in practical operation while at the same time the necessity of employing the exceedingly long lever arms which have commonly been necessary is obviated. Another object of the invention is the provision of apparatus in which the power required for producing the movements necessary to maintain focus is so applied as to enable reductions and enlargements throughout a wide range to be obtained without binding of the parts. Another object of the invention is the production of devices in which a sensitive plate holder, a lens support and a copy support are provided with means for moving two of the same in such manner as to maintain focus, this means including a member which is given a movement less than but proportional to the movement which one of these three named members must have, and multiplying connections between the same and said member designed to give the required movement to said member. That is to say, a movement required for focusing may be produced on a reduced scale and then multiplied up by suitable connections to produce the full sized movement, from which arrangement various improved results accrue.

Another object of the invention is the provision of an apparatus in which the usual somewhat complex system of links and levers for producing the automatic focus is eliminated or simplified and the power transmitting devices rendered more certain in operation. In accordance with the present invention power is or may be applied to a plurality of points on a lever or levers such as the usual right angle bell crank lever, this power being transmitted and applied to such points by means different from the focusing levers themselves. By such means the usual link and lever connections with the focusing lever are done away with, with the consequent elimination of the counteracting thrusts, frictions and losses of power incident to the use of such link and lever systems.

In one embodiment of the invention power is applied to a focusing lever by gear connections or other connections involving the use of a member rotatable about its own axis, such rotational movement being suitably converted and applied to two points on the focusing lever in such manner as to produce effectively and certainly the movements of the lever necessary for maintaining automatic focus.

Another object of the invention is the provision of simple and convenient means whereby the machine may very readily be adjusted for the use of different lenses of various focal lengths.

Other objects of the invention will appear more fully hereinafter. The invention consists in the novel construction, arrangement and combination of parts hereinafter described according to the preferred embodiment thereof. The invention will be more particularly pointed out in the appended claims.

In order that the invention may be more clearly understood attention is hereby directed to the accompanying drawings illustrating certain forms of apparatus embodying the invention. In the drawings—

Referring to the drawings, and particularly to Figs. 1 to 6, the apparatus as illustrated comprises a supporting frame having parallel side portions 1, 1, on which are mounted tracks 2, 2, and longitudinal racks 3, 3.

Supported on rollers 4, 4, running on tracks 2, 2, is a carriage 5 which supports plate holder 5ª and one end of the usual camera bellows 5ᵇ. Carriage 5 is also shown as provided with rollers 6, 6, mounted on vertical axes to bear against the inner faces of tracks 2, 2, in order to prevent lateral movement of the carriage as the latter moves along the tracks.

A shaft 7 extends transversely across carriage 5 and is supported in bearings 7¹ thereon. This shaft carries gears 8, 8, which mesh with racks 3, 3. Shaft 7 is provided at one end with a hand wheel 9 which may be rotated to reciprocate carriage 5 along tracks 2.

A second carriage 10 is provided for the support of the lens and the forward end of the camera bellows, carriage 10 being supported on tracks 2 by rollers 4¹ and also provided with lateral rollers 6¹ which bear against the inner faces of tracks 2 to prevent lateral motion as the carriage moves back and forth over tracks 2. The lens which is indicated in dotted lines in Fig. 1 at 11 is carried by the usual lens support 11ª which is carried by the carriage 10 and to which the forward end of the camera bellows is secured.

The focusing mechanism illustrated herein is of the sliding apex type. A right angle bell crank lever having arms 12 and 13 is pivotally mounted at the apex of the right angle, as shown at 14 to a block 15 carried in transversely extending guides 16, see Fig. 6. The block 15 may be shifted in position transversely of carriage 10 for purposes of adjustment in case a change is made from a lens of one focal length to a lens of a different focal length, as will be more fully described hereinafter. Short blocks 17 and 18 are slidably mounted on arms 12 and 13 respectively of the right angled lever.

Mounted on carriage 10 in suitable bearings 19 is a transverse shaft 20 provided with gears 21, 21, meshing with racks 3. A hand wheel 9¹ is carried by the outer end of shaft 20, by the rotation of which, carriage 10 may be moved back and forth along tracks 2.

It will be noted that accordingly the lens may be adjusted lengthwise of the frame at a uniform speed by the rotation of hand wheel 9¹. Connections will shortly be described whereby the plate-holder-supporting carriage 5 is given the proper movement to maintain focus as the lens carriage moves, either for reduction, or enlargement, the movement of the plate holder carriage being transmitted thereto from the lens carriage and being a movement of constantly changing speed, when the movement of the lens carriage is of uniform speed.

A copy holder is illustrated at 22 as fixedly secured in position on frame 1. It will be understood that automatic focus is maintained by imparting suitable movements to two of the three elements comprising the sensitive plate holder, the lens and the copy. In the embodiment of the invention specifically illustrated the lens carriage and plate holder carriage are shown as the two movable members but it should be understood that the invention is not limited in this respect since the copy holder equally might be made movable and one of the remaining two of the three elements mentioned held stationary.

In the embodiment of the invention now being described the arms 12 and 13 of the right angled bell crank lever are much shorter than would be the case with right angled lever arms connected and operated as commonly used in automatic focusing apparatus if it were attempted to use the latter in working on a commercial scale to effect considerable reduction or enlargement, such as here contemplated. These arms may, for example, be one-quarter of the length they would commonly have to accomplish the desired purpose. The effective use of short lever arms and a comparatively narrow apparatus is made possible by the manner of applying power to suitable points in the system and transmitting such power from one of the lever arms on one member such as the lens carriage to a second member, such as the plate holder carriage. These connections will now be described.

Mounted on shaft 20 is a pinion 23 which meshes with a rack 24 pivotally connected at one end to the sleeve or sliding block on arm 13 of the focusing lever. This rack is adapted to reciprocate in a direction parallel to the stationary racks 3 and is slidably supported and guided by guides 25 mounted on carriage 10, Figs. 1 and 4. A guideway 25² for an extension 25¹ of rack 24 beyond sliding block 18 is also indicated. In the embodiment of the invention illustrated, pinion 23 is positioned at a distance from the apex 14 of the right angled lever equal to one-quarter of the focal length of the lens used, pinion 23 being of a pitch diameter equal to one-quarter of that of gear 21. The use of the particular fractions referred to is not essential, it being only essential that the diameter of pinion 23 should bear the same ratio to the diameter of pinion 21 as the distance between pivot point 14 and pinion 23 bears to the focal length of the lens.

Figure 1:
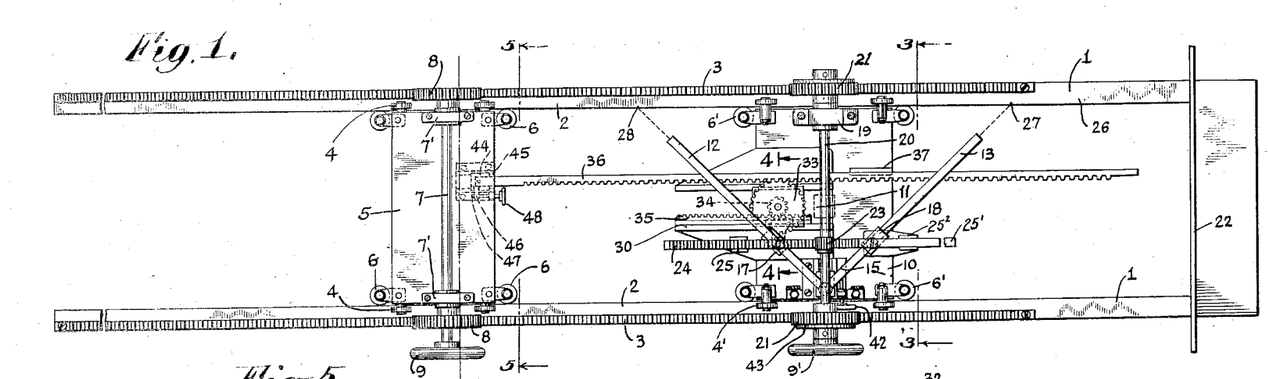
Fig. 1 is a top plan view of one form of apparatus embodying the invention, the plate holder, camera bellows, and lens box not being shown.
Figure 2:
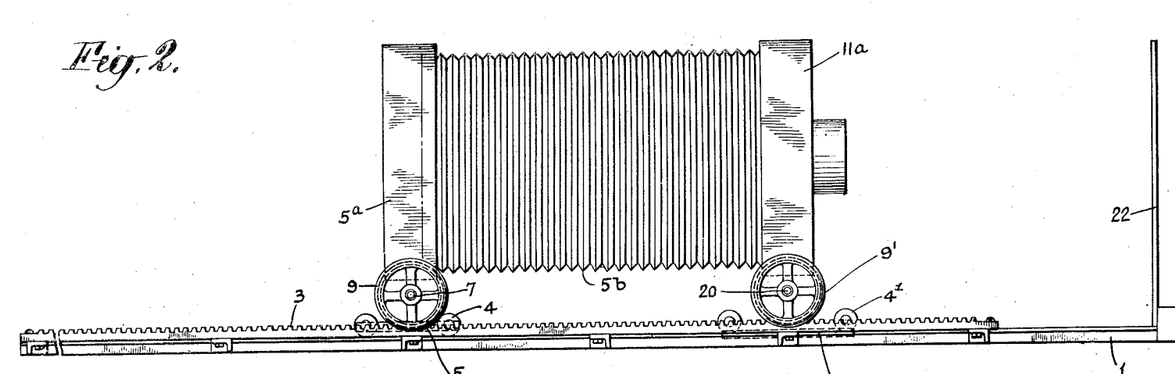
Fig. 2 is a side elevation of the apparatus.
Figure 3:
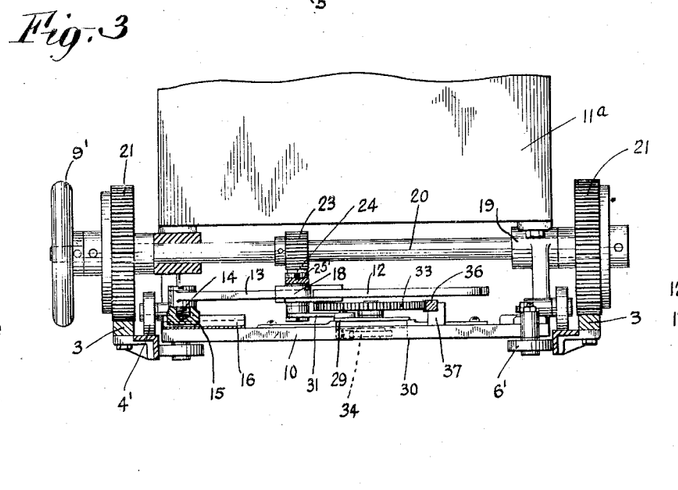
Figs. 3, 4 and 5 are respectively transverse vertical sections on lines 3—3, 4—4 and 5—5 of Fig. 1.

The double armed lever 12, 13, is shown, Fig. 1, in what is termed the unit position of the apparatus, in which the copy will be reproduced without enlargement or reduction. In this position the vertical plane in which shaft 20, as here shown, is situated bisects the right angle between the arms. (It will be noted that shaft 20 need not be in this position, but may extend in other planes parallel to that shown; for convenience of description however, it will be considered as intersecting the apex 14.) The hypothenuse of the right angled triangle, the legs of which are arms 12 and 13, may be considered as extending, in the position of the arms shown, along the line 26, which represents the inner edge of one of the side frame members 1. If arm 13 were extended sufficiently, it would intersect line 26 at the point 27 and arm 12, if sufficiently extended would intersect line 26 at a point 28, as is indicated by dotted lines, Fig. 1. See also the diagram, Fig. 7. The length of the hypothenuse 27, 28, along line 26 is equal to two focal lengths of the lens used and a line normal to the hypothenuse extending from the pivot or apex 14 and bisecting the right angle extends for one focal length between pivot 14 and the imaginary hypothenuse.

It will be evident that when hand wheel 9¹ is rotated, in a counter-clockwise direction, for example, carriage 10 will be moved to the left, referring to Fig. 1, while rack 24 will be moved to the right by engagement with pinion 23. Arms 12 and 13 will accordingly be swung to the right because of the pivotal connection between rack 24 and sleeve 18 on arm 13, the angle between arm 13 and the vertical plane of shaft 20 accordingly increasing while the angle between arm 12 and shaft 20 decreases. Because of the relations between the parts just described the imaginary continuation of arm 13 will continue to intersect line 26 at the point 27 regardless of the movement of carriage 10 back and forth lengthwise of tracks 2. This is, of course, because of the ratio between the diameter of pinion 23 and that of gear 21 being the same as the ratio between distance 14, 23, and the focal length of the lens, the latter being the length of the normal to the hypothenuse.

The apparatus being in the unit position shown in Fig. 1, the length of the imaginary hypothenuse 27, 28, should be two focal lengths, the parts being so adjusted that the point 27 is situated one focal length from the copy holder 22 and the point 28 is situated one focal length from the sensitive plate carried by carriage 5. With the relations of the parts described, the point 28, if contained in a sliding block on arm 12, might be connected by a suitable link to the carriage 5 with the result that carriage 5 would be given a movement for maintaining the parts in focus during the reciprocation of carriage 10. This is in accordance with the laws under which automatic focusing devices of the character described operate and it is believed need not be demonstrated.

If connection were made between the carriage 5 and a sliding block on arm 12 at a point on an extension of the arm corresponding to point 28, arm 12 would have to be of a length very considerably greater than that illustrated. Also practical difficulties might arise in operation of the apparatus for enlargements at certain ratios.

In accordance with the preferred form of the invention the intersection of arm 12 with the hypothenuse is not thus utilized for connection with carriage 5, a point on arm 12 much nearer the apex being utilized as the starting point of connections to carriage 5. Sliding block 17 on arm 12 is constrained to move along a line parallel to rack 24, as the double armed lever swings about its pivot. The movement of block 17 is of course proportional to but less than the movement of the imaginary point 28 on a sliding block, on an extension of arm 12. In my preferred construction I connect sleeve 17 by a multiplying connection to the carriage 5 so as to impart the desired movement to the latter.

Figure 4:
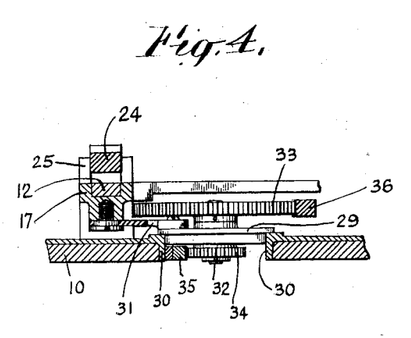
Figure 5:
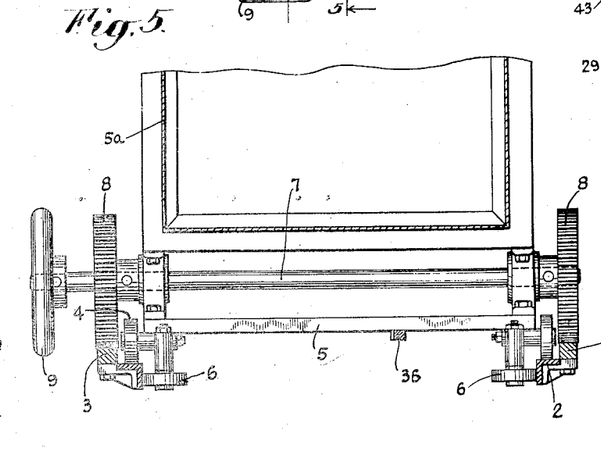
Figure 6:
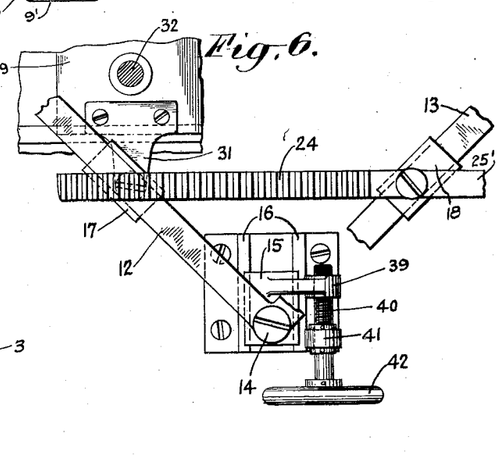
Fig. 6 is a partial plan view on an enlarged scale of a portion of the mechanism shown in Fig. 1.

Referring to Figs. 1, 4 and 6, a carriage 29 is slidably mounted on guideways 30 which extend parallel to racks 3 and are carried by the carriage 10. This carriage 29 is provided with a bracket 31 which is pivotally connected to sliding block 17.

Carriage 29 is provided with a short vertical shaft 32 provided at its upper end with a gear 33, and at its lower end with a pinion 34, both fixed to shaft 32. In the embodiment of the invention illustrated in Fig. 1 gear 33 is of a pitch diameter three times that of pinion 34.

Pinion 34 is constantly in mesh with a longitudinally extending rack 35 which is fixedly secured to carriage 10. Gear 33 constantly meshes with a rack 36 which is adjustably secured at one end to the carriage 5 of the sensitive plate. Rack 36 is guided and held in engagement with gear 33 by a suitable guide 37 secured to carriage 10.

With the construction described rotation of hand wheel 9¹, in a counter-clockwise direction, for example, causes the oscillation of arms 12 and 13 to the right about pivot 14 and the consequent movement of carriage 29 to the right because of its pivotal connections with sliding block 17. Pinion 34 will rotate in clockwise direction about its axis, since it is in meshing engagement with rack 35 fixed to member 10. The larger gear 33 is also accordingly rotated in the same direction as pinion 34, and imparts movement to rack 36 connected to carriage 5. Racks 35 and 36 engage opposite sides of pinion 35 and gear 36 respectively. Accordingly, rack 36 will be moved to the right, relatively to member 10, by engagement therewith of gear 33, as carriage 10 moves to the left.

In the movement described, for reduction, rack 36 and carriage 5 will move to the left, relatively to the fixed bed of the machine, while carriage 10 is moving to the left, but at a less rate than carriage 10. The lessening of the distance between carriages 10 and 5, or movement of carriage 5 to the right, relative to carriage 10, takes place at a rate which is three times the rate at which the sliding carriage 29 is moving to the right, relative to member 10. Now, sliding carriage 29 is itself moving towards the vertical plane of shaft 20 at a rate which is equal to one-quarter of that which carriage 5 should have. Accordingly rack 36 is given movement to the right, relative to carriage 10, equal to the sum of the movement of carriage 29 relative to carriage 10 and the movement of rack 36 relative to carriage 29, or one-quarter plus three-quarters the movement which carriage 5 should have. That is to say, the multiplying connection provided, as described, causes carriage 5 to move in the same manner as if it were directly connected to point 28, if the latter were included in a sliding block mounted on an extension of arm 12 and constrained to move along the straight line 26.

It will be seen that when carriage 10 is moved in the opposite direction for enlargement the reverse action takes place, that is to say, the multiplying connection described results in carriage 5 being moved in relation to carriage 10 in the same manner as if it were connected directly to a pivotal point on a sliding block on an extension of arm 12 at the intersection of such extension with the imaginary hypothenuse of the focus lever triangle. Theoretically both carriages 5 and 10 may be operated for either reduction or enlargement by rotation of hand-wheel $9^1$ of carriage 10. In actual practice with the apparatus illustrated it may be advisable, to prevent binding, to operate by means of hand wheel 9 of carriage 5 when obtaining enlargements at various ratios, and by hand wheel $9^1$ for reductions.

Figure 9:
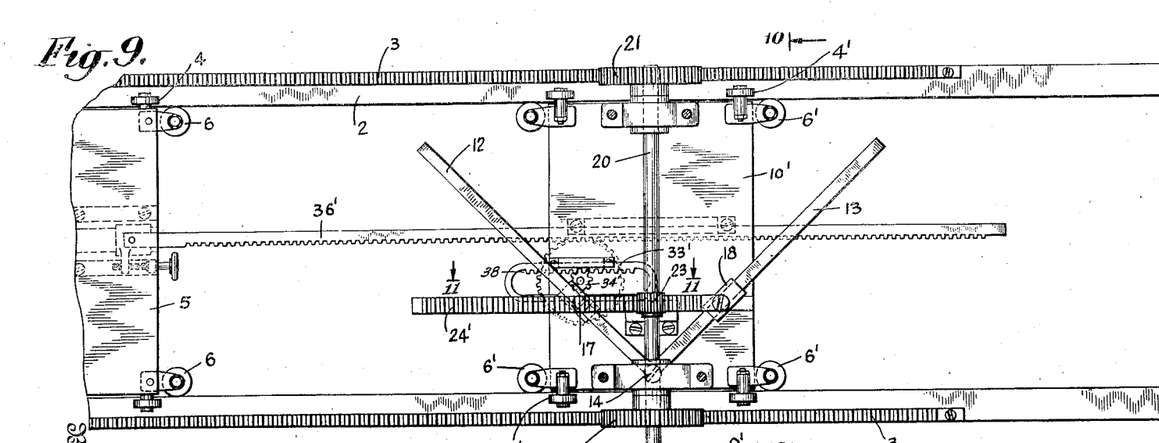
Fig. 9 is a plan view similar to that shown in Fig. 1 but of a modified form of apparatus.
Figure 10:
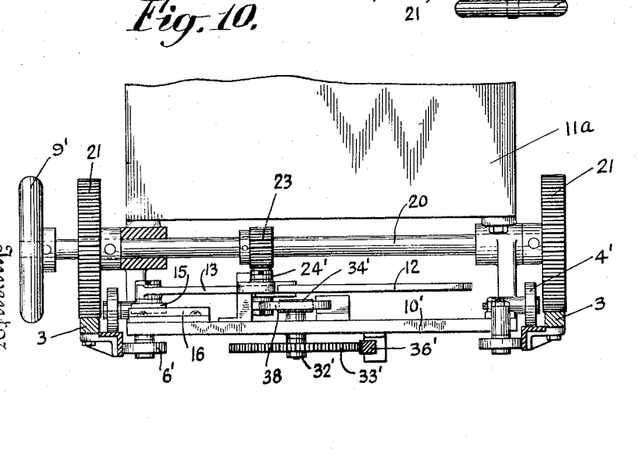
Fig. 10 is a transverse vertical section on line 10—10 of Fig. 9.
Figure 11:
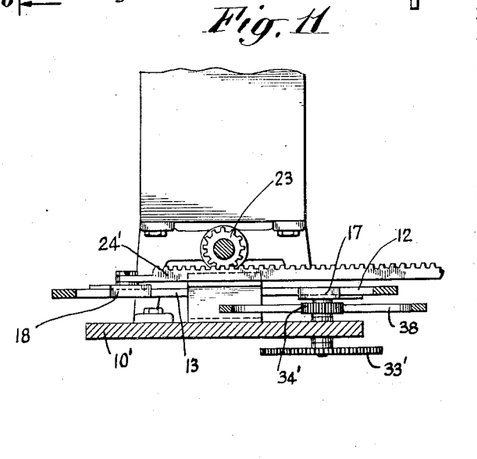
Fig. 11 is a partial longitudinal vertical section taken on line 11—11 of Fig. 9.

Similar results are obtained in the modified form of apparatus shown in Figs. 9 and 10 and 11. In these figures the carriage $10^1$ carries the lens holder and is mounted in the same manner as carriage 10 in the form of apparatus first described. In this case the rack $24^1$ is pivotally connected to sliding block 18 on arm 13 of the right angled lever and is engaged by pinion 23 on shaft 20 in the same manner as in the form previously described, pinion 23 being of a pitch diameter equal to one-quarter that of gear 21 and located at a distance from the pivot 14 of the right angle equal to one-quarter the focal length of the lens.

In this case, however, multiplying connection between the sliding block 17 on lever arm 12 and the plate carriage 5 is modified, the sliding carriage 29 of the form of construction first described being eliminated. A rack 38 is pivotally connected to sliding block 17 and is suitably guided for reciprocation parallel to the fixed racks 3 of the machine. This rack engages with a pinion $34^1$ fixed on a short vertical shaft $32^1$, which in this case is mounted for rotation in carriage $10^1$. A gear $33^1$ of four times the pitch diameter of pinion $34^1$ is secured to the lower end of shaft $32^1$ and meshes with the rack $36^1$ which is adjustably secured to carriage 5. Accordingly the movement of lever arm 12 towards or away from the vertical plane extending through the axis of shaft 20 results in the rotation of gear $33^1$ at a rate to produce, in the rack $36^1$, four times the movement of that of the pivotal connection on sliding block 17. Thus the carriage 5 will be moved with carriage $10^1$ at the rate which is proper for maintaining automatic focus, carriage 5 moving relatively to carriage $10^1$, towards or away from the same at four times the speed with which sliding block 17 itself moves towards or away from the vertical center line of carriage $10^1$.

An additional feature of the invention which has not heretofore been referred to in detail comprises means for making the necessary adjustments in a simple and convenient manner when a lens of one focal length is to be substituted for a lens of a different focal length. As has been stated the apex or pivot 14 of the double armed focusing lever, Figs. 1 and 6, is carried by a sliding block 15 on guideways 16 extending transversely of the lens supporting carriage 10. Provision is made for adjusting the position of block 15 and maintaining the same in adjusted position, suitable for the use of a lens of desired focus. As shown in Fig. 6 block 15 may be rigidly connected to a nut 39 on a screw 40 rotatably mounted in a suitable bearing or bearings on carriage 10, such as the bearing 41. Screw 40 carries at its outer end a hand wheel 42.

When it is desired to change the lens to one of different focal length the two gears 21 are first disconnected from their shaft 20 after which hand wheel 42 is turned to position pivot 14 of the double armed lever at a point which is distant from pinion 23 by an amount exactly equal to the proper fraction, such as one-quarter of the focal length of the lens which is to be used. In actual practice it is convenient to provide discs on shaft 20 adjacent to gears 21, these discs 43, referring to Fig. 1, being fixedly secured to the shaft. Gears 21 may be secured to the shaft by securing them to discs 43, the discs each being provided with a series of peripheral openings in any one of which a pin extending from the face of the adjacent gear may be inserted, it not being thought necessary to illustrate this detail of construction. When the gears are to be disconnected from shaft 20 it is accordingly only necessary to remove the pins referred to.

When gears 21 have been disconnected from shaft 20, as stated, and sliding block 15 is adjusted in position by hand wheel 42 to properly locate pivot 14 for a lens of different focal length, as stated, rack 24 will move lengthwise because of the movement of sliding block 18 on arm 13 into a different position. This lengthwise movement of rack 24 rotates pinion 23 and shaft 20 to some extent. It is because of this rotation of shaft 20 that gears 21 are disconnected, as stated, from shaft 20 when this adjustment is made.

When pivot 14 of the double lever is thus adjusted the multiplying gear connections between the plate holder carriage 5 and the lens carriage will be operated automatically to adjust the distance between the two carriages to that which is proper for the focal length of the lens now to be used. This is true because sliding block 17 on arm 12 necessarily moves to the right or the left, referring to either Fig. 1 or Fig. 9, when the focusing lever arms are moved into a new position parallel to their previous positions. Such movement of sliding blocks 17 in the form of construction shown in Fig. 1 causes the movement of sliding carriage 29 to the right or to the left with the consequent rotation of gear 33 and lengthwise movement of rack 36. In the construction shown in Fig. 9 the rack 38 will be moved lengthwise, by the movement of sliding block 17 referred to, with the consequent rotation of gears $34^1$ and $33^1$ and movement of rack $36^1$.

To complete the adjustment it is only necessary to properly position carriage 10 in relation to copy holder 22 and to make an adjustment of the point of connection between rack 36 and carriage 5, and to reconnect gears 21 to shaft 20. It will be recollected that when the focusing lever is in the unit position, as shown in Fig. 1, the distance between the sensitive plate and the copy must be equal to four focal lengths of the lens. This distance of four focal lengths is made up of one focal length between the copy held by copy holder 22 and the point of intersection of arm 13 with the theoretical hypothenuse of the focusing lever triangle; one focal length between the intersection of the line of arm 12 with the theoretical hypothenuse and the sensitive plate carried by carriage 5; and two focal lengths extending along the hypothenuse between the intersections of the same with arms 12 and 13. Considering for convenience the intersections of arms 13 and 12 with the hypothenuse as being the points 27 and 28 previously referred to, it will be noted that the adjustment which has been made by rotation of hand wheel 42 has not positioned point 27 at a distance of one focal length of the new lens from copy holder 22. This correction may now be made by rotating hand wheel $9^1$ to move carriage 10 into such position that the distance from point 27 to copy holder 22 will equal one focal length of the new lens. When the adjustment referred to has been completed gears 21 are again secured to shaft 20 by, for example, extending pins from gears 21 into the aligning openings in discs 43 secured to shaft 20.

The distance from point 28 to the sensitive plate may now be adjusted to equal one focal length of the new lens which may readily be accomplished by reconnecting rack 36 to carriage 5 at the proper point. This may conveniently be accomplished by an adjustment entirely similar to that by which pivot 14 of the focusing lever was adjusted as described above. That is to say, rack 36, as indicated in Fig. 1, has its left hand end secured to a sliding block 44 mounted in slideways 45, sliding block 44 being rigidly connected to a nut 46 on a screw shaft 47 rotatably mounted in suitable bearings in carriage 5. Screw 47 is provided with a hand wheel 48 by which the adjustment of block 44 may be accomplished.

The adjustment of the focusing lever by hand wheel 42 as described, together with adjustment of carriage 10 in relation to copy holder 22 and the adjustment of rack 36 in connection with carriage 5 will reestablish the three members, namely the plate holder, the lens holder and the copy holder in correct focusing relation for the new lens very conveniently and simply.

Figure 7:
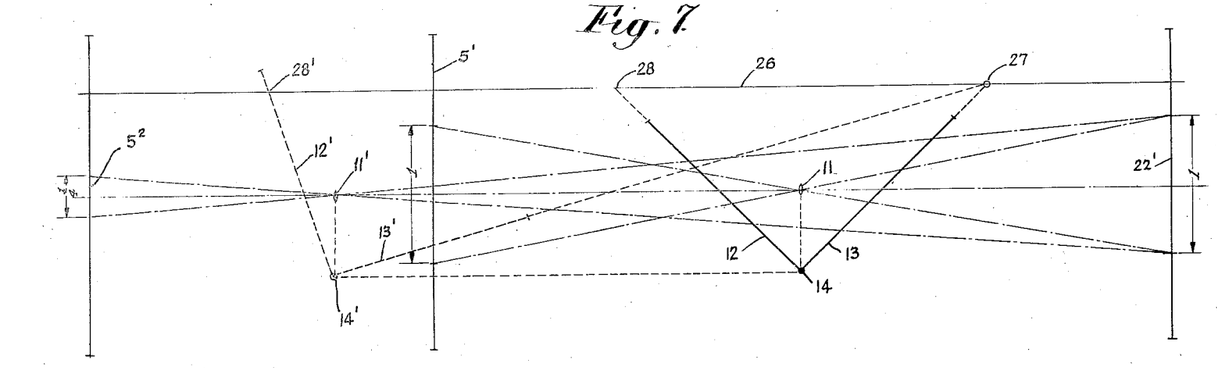
Fig. 7 is a diagram illustrating the relations of the parts in unit position and for reduction to one-quarter size.
Figure 8:
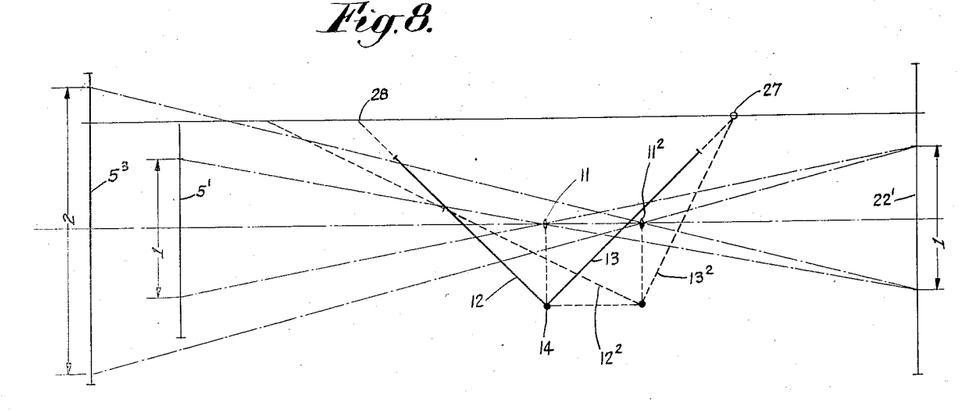
Fig. 8 is a similar diagram illustrating the relation of the parts for unit position and for enlargement of the object to twice the size.

The relations of the parts for the unit position, one quarter reduction, and two to one enlargement, are indicated in the diagrams Figs. 7 and 8. In Fig. 7 arms 12 and 13 of the focusing lever are shown in full lines in the unit position, the lens 11 being indicated in its position midway between arms 12 and 13. As is indicated by the dot and dash lines the rays of light passing through the lens will produce an image on the sensitive plate represented by line $5^1$ equal in size to the copy $22^1$.

When the apparatus is being adjusted for the reduction to one-quarter size, for example, hand wheel $9^1$ will be rotated in counter-clockwise direction until pivot 14 of the double lever has moved into the position indicated at $14^1$. The lever arms will be rotated to the right during this movement so that arm 13 will occupy the position shown by the dotted line 13¹, which still intersects the hypothenuse line 26 at point 27. Arm 12 will now occupy the position indicated by dotted line 12¹ and will intersect line 26 at the point 28¹. The lens will have moved into the new position 11¹ and the sensitive plate will have moved into the position indicated by line 5². In this position a reduction of one-quarter will be effected as indicated by the dot and dash lines, the sensitive plate having moved to the left as the lens moves to the left, but having done so at a lesser rate than the lens so that it is considerably nearer to the lens in its new position than it was in the unit position.

In Fig. 8 the parts are shown in the unit position and also in the position of two to one enlargement. Carriage 10 has been moved to the right in this latter case so that lens 11 has moved into the position indicated at 11². Arms 12 and 13 have swung to the left into the positions 12² and 13². Because of the connections which have been described the sensitive plate is in position indicated by line 5³ in which it is somewhat to the left of its position indicated by line 5¹ corresponding to the unit position of the lever, in spite of the fact that the lens has moved to the right.

It is believed that the operation of the device will be entirely clear from the above description. The theoretical considerations upon which automatic focusing is accomplished in the case of a focusing mechanism of the so-called sliding apex type are well known as exemplified, for example, in patent to Holst 1,029,297, dated June 11, 1912. It may be remarked that the present invention is not necessarily limited to focusing devices of the sliding apex type but may be applied as well to focusing devices of the so-called sliding hypothenuse type, as exemplified, for example, in patent to Holst and Chouinard 1,131,629, dated March 9, 1915.

The apparatus may be changed from the sliding apex to the sliding hypothenuse type, for example, in case an apparatus is used involving the use of prisms for reflecting the rays of light at a right angle, the prism or device for thus bending the rays of light being positioned between the copy and the lens. Such devices are commonly used in various classes of work.

In this case the apparatus as shown in Fig. 1, for example, would be modified by the rotation of arm 12 of the double armed lever through 90° from its position shown in Fig. 12 into position in which it forms in effect a continuation of the arm 13. Arm 13 with its sliding block 18 and the rack 24 remain in the position shown in Fig. 1. The plate holder carriage 5, however, must now be adapted to travel along a path at right angles to that in which it travels in the construction shown in Fig. 1. Arm 12 in its new position will carry sliding block 17 connected by the multiplying connections exactly as have been described whereby rack 36 is reciprocated, this rack, however, now extending in a position at right angles to that shown in Fig. 1. That is to say, rack 36 will engage with gear 33 or gear 33¹, Figs. 1 and 9, and will extend parallel to shaft 20 instead of at right angles thereto to a connection with the plate carriage which may be considered as positioned beyond the position of the upper rack 3, referring to Fig. 1, the plate holder carriage being movable along ways similar to tracks 2 but extending at right angles to the tracks 2 shown in Fig. 1. It is thought that the modified connections referred to will be entirely clear without necessity of additional illustration for the same.

It should be noted that with the apparatus described the lens carriage may be given a uniform rectilineal movement by operation of hand wheel 9¹ whereupon the plate holder 5 will have a constantly changing rectilineal movement, or the plate holder 5 may be given the uniform movement by rotation of hand wheel 9 whereupon the lens carriage will have a rectilineal movement of constantly changing speed. In actual practice it is deemed advisable to operate by means of hand wheel 9¹ during reduction and by means of hand wheel 9 during enlargement. It should, moreover, be noted that the focusing lever and connected parts might have been mounted on the carriage 5 instead of on carriage 10 with rack 36 extending therefrom to carriage 10. Also that copy holder 22 might have been made one of the movable members while another one of the three members necessary for the focusing operation, namely the sensitive plate, the lens and the copy, is held stationary, the two movable members being connected in similar manner as has been described in connection with carriages 10 and 5.

It should also be noted that the invention is not limited to the particular gear and rack connections which have been particularly described, but that various gear or other positive acting connections may be employed for applying power to desired points on the focusing lever. One of the advantages of the invention is that thereby the usual somewhat complicated system of links and levers for applying power to the focusing lever is eliminated. Such links and levers are somewhat wasteful of power and the use of the same is likely to cause binding of the apparatus in certain positions of the focusing lever. This is because of the fact that in such link and lever systems power must in some cases be transmitted at disadvantageous angles in which a portion only of the force applied will be directed in the proper direction, counter-acting thrust and friction losses being an incident to such systems. In the present invention power is applied to the focusing lever by means in which the thrust is applied directly to the point to which it should be applied in contra-distinction to power applied at an angle to the desired line of movement of the point in question in which case a component of the force applied is wasted. Thus, in the construction illustrated power is applied to sliding block 18 on arm 13 by rack 24 which acts directly in the required line of movement of the pivot point on sliding block 18. Furthermore the thrust of rack 24 is always exerted in the same straight line rather than in a direction which is constantly changing as in the case of some of the link and lever connections of the prior art referred to.

Generally speaking, it may be noted that the preferred connections or means of transmitting power to the double armed lever comprise a member which is rotatable about its own axis, such as a gear or screw, or other toothed member, or rotatable drum, or the like, the shaft 20 with gear 21 thereon being the specific embodiment illustrated of such rotary member; the power being transmitted to the focusing lever by means independent of the focusing lever itself. It will also be noted that the power is preferably applied positively to two points on the lever such as the pivot 14 and the pivotal connection of rack 24 with sliding block 18 on arm 13, the power thus being applied most advantageously for rotating the lever.

It will also be particularly noted that the arms of the double armed lever are on account of the construction employed very much shorter than the arms of focusing levers heretofore used in connection with lenses of the same focal length as are contemplated herein, and where any considerable enlargement or reduction is attempted.

It should be understood that the invention is not limited strictly to the details of constructions which have been particularly described, but that the same is as broad as is indicated by the accompanying claims.

What I claim is:—

1. In an automatic focusing device, the combination of a plate holder, a lens support and a copy support, a lever pivoted on one of said three members, and having a sliding block on each arm, means for reciprocating said member, means connected to one block, acting always in a line parallel to the line of movement of the pivot of said lever, at a distance from said last named line equal to a fraction of the focal length of the lens, for rotating said lever as said member reciprocates, said rotating means operating at a fraction of the speed of movement of said member, and multiplying connections between said other block and a second one of said three first mentioned members adapted to maintain focus at all times.

2. In an automatic focusing device, the combination of a plate holder, a lens support and a copy support, a right angle lever pivoted at the apex of its right angle on one of said three members and having a sliding block on each arm, means for reciprocating said member, means connected to one block, acting always in a line parallel to the line of movement of said member, for rotating said lever as said member reciprocates, means connected to the other block, moving always in a line parallel to said first named lines, and connections between said last named means and a second one of said three first mentioned members adapted to maintain focus at all times.

3. In an automatic focusing device, the combination of a plate holder, a lens support and a copy support, a lever pivoted on one of said three members and having a sliding block on one of its arms connected to a second one of said members, means for reciprocating said member, means on said member having an axis at right angles to the line of movement of said member and rotatable about said axis as said member reciprocates, connections from said rotating means to a point on said lever for rotating the latter about its pivot, said connections always acting in a plane parallel to the line of movement of said member, and connections between said block and a second one of said three first mentioned members adapted to maintain focus at all times.

4. In an automatic focusing device, the combination of a plate holder, a lens support and a copy support, a lever pivoted on one of said three members, and having a sliding block on each arm, means for reciprocating said member, means connected to one block, acting always in a line parallel to the line of movement of the pivot of said lever, at a distance from said last named line equal to a fraction of the focal length of the lens, for rotating said lever as said member reciprocates, said rotating means operating at a fraction of the speed of movement of said member, multiplying connections between said other block and a second one of said three first mentioned members adapted to maintain focus at all times, and means for adjusting the position of the pivot of said lever toward or away from the line in which said rotating means operates, to maintain the distance of the pivot from said line always at the same fraction of the focal length of the lens used, when lenses of different focal length are substituted.

5. In an automatic focusing device, the combination of a plate holder, a lens support, and a copy support, a right angle lever, the pivot point of which at the apex of the right angle thereof is connected to one of said members and another point on which is connected to a second one of said members, and means for causing simultaneous translation of said lever in a path parallel to the axis of the lens and rotation of said lever about its pivot in such manner as to produce such rectilinear movement of said two connected members as to maintain focus at all times at different degrees of enlargement and reduction, said means including a member rotatable about its own axis, through more or less than one revolution in accordance with the amount of movement required, and means coacting with said rotatable member for converting and applying its rotational movement to said lever.

6. In an automatic focusing device, the combination of a plate holder, a lens support, and a copy support, a right angle focusing lever pivoted on one of said three members, a member on the said one of said three members, and rotatable about its own axis, connections therefrom to the pivot of said lever for giving the same a rectilinear movement, which may be uniform, connections from said rotatable member to a point on one of the arms of said lever for imparting a swinging movement to said lever about its pivot during the rectilinear movement of said pivot, and connections between one of the arms of said lever and a second one of said first three mentioned members for so moving the latter as to maintain focus during the movement of the first mentioned member.

7. In an automatic focusing device, the combination of a plate holder, a lens support, and a copy support, a lever, one point on which is connected to one of said members and another point on which is connected to a second one of said members, and means for causing simultaneous translation and rotation of said lever in such manner as to produce such rectilinear movement of said two connected members as to maintain focus at all times, said means including a member rotatable about its own axis, and connections therefrom to one point on said lever for producing translation thereof, and from said rotatable member to a second point on said lever, to impart a movement of rotation to said lever, said latter connections including a member the thrust or tension of which is exerted always in the same straight line.

8. In an automatic focusing device, the combination of a plate holder, a lens support, and a copy support, a lever, pivotally mounted on one of said three members, means for reciprocating said member, means on said member rotatable about its own axis as said member reciprocates, connections from said rotating means to a point on said lever for rotating the latter about its pivot, and connections between said lever and a second one of said three first mentioned members adapted to maintain focus at all times.

9. In an automatic focusing device, the combination of a plate holder, a lens support, and a copy support, a lever, pivotally mounted on one of said three members, a stationary rack, a transverse shaft on said member having a pinion engaging said rack to reciprocate said member, connections from said shaft to a point on said lever for rotating the latter about its pivot, and connections between said lever and a second one of said three first mentioned members adapted to maintain focus at all times.

10. In an automatic focusing device, the combination of a plate holder, a lens support, and a copy support, a lever, pivotally mounted on one of said three members, means for reciprocating said member, a sliding block on said lever, means acting only in a line parallel to the movement of said member upon said sliding block to cause rotation of said lever about its pivot as said member reciprocates, the movement imparted to said block in said line being proportional to the movement of said member, and connections between said lever and a second one of said three first mentioned members adapted to maintain focus at all times.

11. In an automatic focusing device, the combination of a plate holder, a lens support, and a copy support, a lever pivotally mounted on one of said members, means for reciprocating said member and the pivot of said lever, a sliding block on said lever, means for applying power to said block to rotate said lever about its pivot during reciprocation of said member, said power applying means acting to produce motion of said block through a path parallel to the line of movement of said lever pivot, said path being distant from the path of said pivot an amount equal to a fraction of the focal length of the lens used, said means acting to produce motion of said block relative to said member at a speed which bears the same ratio to the speed of said pivot that the distance between said two paths bears to the focal length of the lens, and connections between a different point on said lever and a second one of said three first mentioned members.

12. In an automatic focusing device, the combination of a plate holder, a lens support, and a copy support, a lever, pivotally mounted on one of said three members, a stationary rack, a transverse shaft on said member having a pinion engaging said rack to reciprocate said member, a slidable block on said lever, a rack pivotally connected to said block and guided for reciprocation parallel to said stationary rack, a pinion on said shaft engaging said reciprocating rack, and connections between said lever and a second one of said first three mentioned members.

13. In an automatic focusing device, the combination of a plate holder, a lens support, and a copy support, a lever, one point on which is connected to one of said members and another point on which is connected to a second one of said members, and gear means for causing simultaneous translation of said lever in a path parallel to the axis of the lens and rotation of said lever about its pivot in such manner as to produce such movements of said two connected members as to maintain focus at all times at different degrees of enlargement and reduction.

14. In an automatic focusing device, the combination of a plate holder, a lens support, and a copy support, means for moving one of said three named members in a straight line, a lever pivotally mounted on said member, a sliding block on said lever, means for causing said block to move in a line parallel to the line of movement of said member as said lever rotates, means for so rotating said lever about its pivot, as said member moves, as to impart to said block a movement less than but proportional to that which a second one of said three named members should have to produce focus at all times, and a multiplying connection between said sliding block and said second member to impart to the latter the proper movement to maintain focus.

15. In an automatic focusing device, the combination of a plate holder, a lens support, and a copy support, a focusing lever pivoted on one of said members, said member being movable in a straight line, a sliding block on one of the arms of said lever, guided to move in a straight line at an angle to the length of said arm, means for rotating said lever about its pivot as said member moves, and a multiplying connection between said sliding block and a second, movable, one of said three named members.

16. In an automatic focusing device, the combination of a plate holder, a lens support and a copy support, a right angle lever pivoted at the apex of its right angle on one of said three members, means for reciprocating said member, a sliding block on one arm of said lever, means for applying power to said block to rotate said lever about its pivot during reciprocation of said member, said power applying means acting to produce motion of said block through a path parallel to the line of movement of said lever pivot, a sliding block on the other arm of said lever, a reciprocating carriage, guided for movement in a path parallel to that of said first block, and connected to said second block, and a multiplying connection between said carriage and a second one of said three first mentioned members, said first means acting to produce motion of said first block relative to said first member at a speed which bears the same ratio to the speed of said pivot that the distance between the paths of said first block and of said lever pivot bears to the focal length of the lens.

17. In an automatic focusing device, the combination of a plate holder, a lens support, and a copy support, a lever, pivotally mounted on one of said three members, a stationary rack, a transverse shaft on said member having a pinion engaging said rack to reciprocate said member, a slidable block on said lever, at one side of the pivot thereof, a rack pivotally connected to said block and guided for reciprocation parallel to said stationary rack, a pinion on said shaft engaging said reciprocating rack, a slidable block on said lever at the opposite side of the pivot thereof from said first block, and multiplying connections between said second block and a second one of said first three mentioned members, said second pinion being distant from the path of said pivot an amount equal to a fraction of the focal length of the lens used, and said second pinion having a diameter which bears the same ratio to the diameter of said first pinion that the distance between said second pinion and the path of said pivot bears to the focal length of the lens.

18. In an automatic focusing device, the combination of a plate holder, a lens support, and a copy support, a lever, pivotally mounted on one of said three members, means for reciprocating said member, including a transverse shaft thereon and means coacting therewith, a slidable block on one arm of said lever, connections between said shaft and said block for rotating said lever as said shaft rotates, said means acting in a line parallel to the line of movement of said lever pivot at a distance from the said last named line equal to a fraction of the focal length of the lens used, a slidable block on the other arm of said lever, and connections between said second block and a second one of said three first mentioned members adapted to maintain focus at all times.

19. In an automatic focusing device, the combination of a plate holder, a lens support, and a copy support, means for moving one of said three named members in a straight line, a right angle lever pivotally mounted at the apex of its right angle on said member, a sliding block on each arm of the lever, means for causing one block to move in a line parallel to the line of movement of said member as said lever rotates, means for applying power to the other block to so rotate the lever about its pivot as said member moves, as to impart to said first block a movement less than but proportional to that which a second one of said three named members should have to produce focus at all times, and a multiplying connection between said first block and second member to impart to the latter the proper movement to maintain focus.

20. In an automatic focusing device, the combination of a track, a carriage movable thereon, a guideway on said carriage transverse to the line of movement thereof, a block slidably mounted on said guideway, a focusing lever pivoted on said block, a fixed rack parallel to the line of movement of said carriage, a transverse shaft on said carriage, a gear detachably secured to said shaft, meshing with said rack, a sliding block on said lever, positive connections between said shaft and last named block, for moving the latter in a straight line as said shaft revolves, and adjustment means for adjusting the position of said first named block on said guideway.

21. In an automatic focusing device, the combination of a plate holder, a lens support and a copy support, tracks on which two of said three members are movably mounted, a guideway on one of said two members transverse to the line of movement thereof, a block slidably mounted on said guideway, a focusing lever pivoted on said block, means for rotating said lever as the member on which it is mounted moves, connections between a point on said lever and the second of said two movable members, rotatable adjustment means for adjusting the position of said block on its guideway, and rotatable adjustment means for adjusting the point of connection between said connections and the said second member.

22. In an automatic focusing device, the combination of a track, a carriage movable thereon, a guideway on said carriage transverse to the line of movement thereof, a block slidably mounted on said guideway, a focusing lever pivoted on said block, means for reciprocating said carriage, including a transverse shaft on said carriage and a driving element thereon, a sliding block on said lever, connections between said shaft and sliding block for moving the latter in a straight line as said shaft revolves, including a driving element on said shaft, one of said driving elements being detachably secured to said shaft, and adjustment means for adjusting the position of said first named block on said guideway.

23. In an automatic focusing device, the combination of a plate holder, a lens support, and a copy support, a right angle lever pivoted at the apex of its right angle, on one of said three members, and having a sliding block on one of its arms connected to a second one of said members, and means for causing simultaneous translation of said first member and lever pivoted thereon, and rotation of said lever, by forces acting always and entirely in planes parallel to the line of movement of said first member so as to maintain focus at different degrees of enlargement and reduction.

24. In an automatic focusing device, the combination of a plate holder, a lens support, and a copy support, a lever pivotally mounted on one of said three members, means for reciprocating said member, means on said member rotatable about its own axis as said member reciprocates, said member extending in a plane parallel to that in which said lever is situated, both of said planes being transverse to the line of movement of said first member, connections from said rotating means to a point on said lever for rotating the latter about its pivot, said connections acting always in a line parallel to the line of movement of said first mentioned member, and connections between said lever and a second one of said three first mentioned members adapted to maintain focus at all times.

25. In an automatic focusing device, the combination of a plate holder, a lens support, and a copy support, a lever, pivotally mounted on one of said three members, a stationary rack, a transverse shaft on said member having a pinion engaging said rack to reciprocate said member, said shaft and lever both extending in planes transverse to the line of movement of said member, connections from said shaft to a point on said lever for rotating the latter about its pivot, said connections always acting in a line parallel to the direction of movement of said member and being separated in the axial direction of said shaft from the pivot of said lever, and connections between said lever and a second one of said three first mentioned members adapted to maintain focus at all times.

26. In an automatic focusing device, the combination of a plate holder, a lens support, and a copy support, a right angle lever, pivotally mounted at the apex of its right angle, said pivotal point being connected to one of said members and another point on said lever being connected to a second one of said members, and means for causing simultaneous translation and rotation of said lever in such manner as to produce such rectilinear movement of said two connected members as to maintain focus at all times, said means including a member rotatable about its own axis and connections therefrom to one point on said lever for producing translation thereof, and from said rotatable member to a second point on said lever to impart a movement of rotation to said lever, said latter connections including a member the thrust or tension of which is exerted always in the same straight line, parallel to the direction of movement of said first mentioned member.

27. In an automatic focusing device, the combination of a plate holder, a lens support and a copy support, a focusing lever pivoted on one of said members, said member being movable in a straight line, a sliding block on one of the arms of said lever, guided to move in a straight line at an angle to the length of said arm, means for rotating said lever about its pivot as said member moves, said last named means moving at a fraction of the speed of movement of said member, and a multiplying connection between said sliding block and a second, movable, one of said three named members.

28. In an automatic focusing device, the combination of a plate holder, a lens support, and a copy support, a right angle lever pivoted at the apex of its right angle on one of said three members, means for moving said member, a movable carriage, a slidable block on one arm of said lever connected to said carriage, connections for so rotating said lever as said first means operates as to impart to said carriage a movement less than but proportional to that which a second one of said three named members should have to produce focus at all times, and a multiplying connection between said carriage and said second member to impart to the latter the proper movement to maintain focus.

29. In an automatic focusing device, the combination of a plate holder, a lens support and a copy support, a lever pivotally mounted on one of said three members, a stationary rack, a transverse shaft on said member having a pinion engaging said rack to reciprocate said member, a slidable block on said lever, a rack pivotally connected to said block and guided for reciprocation parallel to said stationary rack, a pinion on said shaft engaging said reciprocating rack, said last named pinion being distant from the pivot of said lever in the axial direction of said shaft an amount equal to a fraction of the focal length of the lens used, a second sliding block on said lever, and multiplying connections between said second block and a second one of said three first mentioned members.

30. In an automatic focusing device, the combination of a movable carriage, a focusing lever pivoted thereon, means for reciprocating said carriage, means acting in a line parallel to the line of movement of said lever for rotating said lever as said carriage reciprocates, and means acting transversely to said line for adjusting the position of the pivot of said lever toward or away from said line, to maintain the distance of the pivot from said line always at the same fraction of the focal length of the lens used, when lenses of different focal length are substituted.

31. In an automatic focusing device, the combination of a plate holder, a lens support, and a copy support, a lever pivoted on one of said three members, and having a sliding block on one of its arms connected to a second one of said members, said lever extending transversely across said first member, means for reciprocating said first member and rotating said lever by forces acting in parallel lines, and means for adjusting the pivot of said lever transversely to said lines.

In testimony whereof I have signed my name to this specification.

HARRY C. JONES.